Patented July 24, 1951

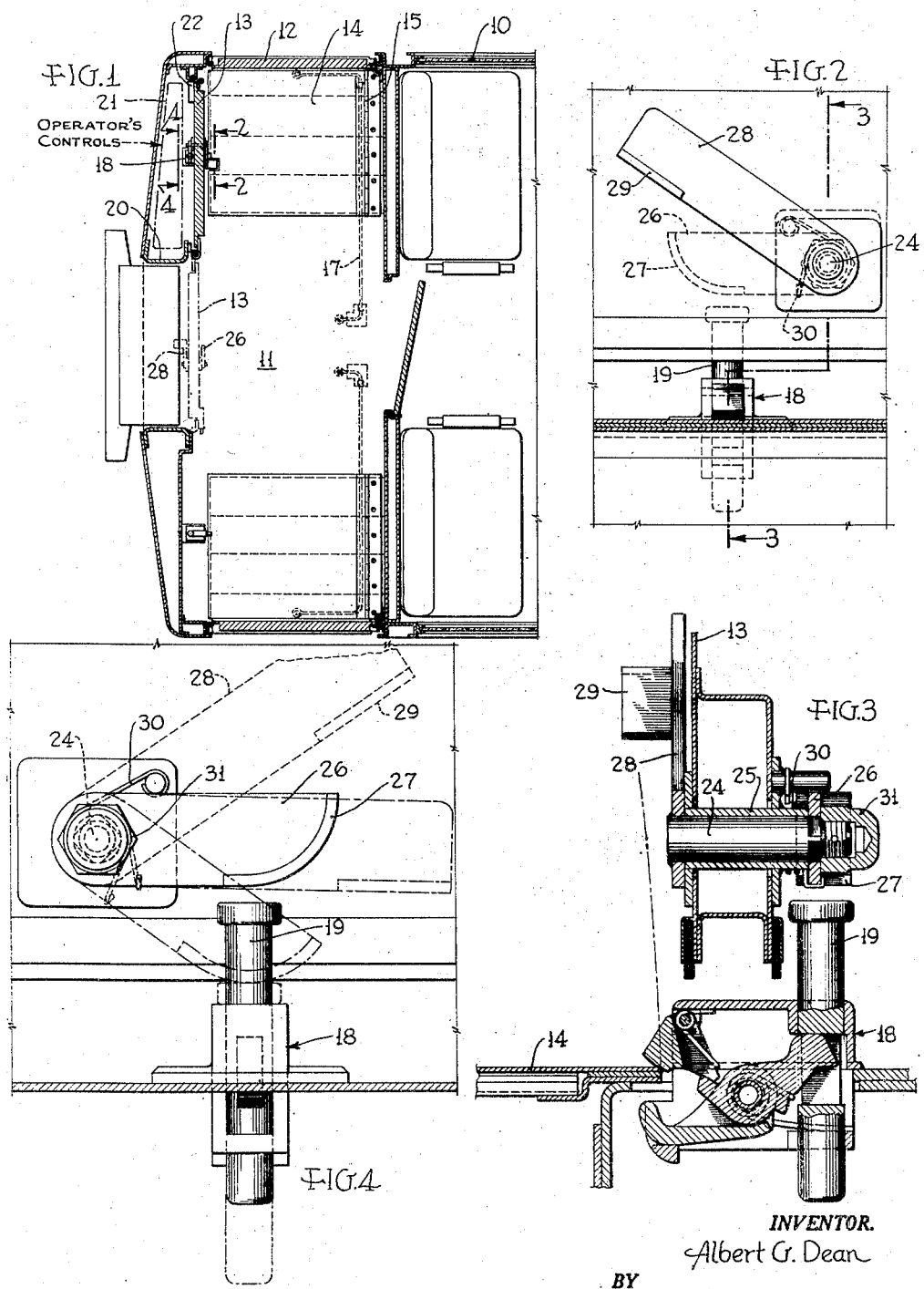

2,561,651

UNITED STATES PATENT OFFICE 2,561,651

TRAP-DOOR LATCH OPERATING MEANS

Albert G. Dean, Narberth, Pa., assignor to The Budd Company, Philadelphia, Pa., a corporation of Pennsylvania Application November 17, 1949, Serial No. 127,971

3 Claims. (Cl. 105—435)

This invention relates to trap door latch operating means, especially to operating means for the latches of railway car vestibule trap doors adapted to operate the latches when they are covered by a vestibule end door, and has for an object the provision of improvements in this art.

On a certain type of railway car, such for example as a multiple unit or "M. U." car, operator's controls are provided at each end of each car. Most subway and suburban cars are of this type. The controls are located at one side of the end of the car and at certain times they are covered by a vestibule door which when the controls are in use is located in some other position. The vestibule door may be used to close the front end of the car across the center aisle or it may be used to close off the operator's compartment at the controls. In any case, the door is frequently closed over the controls, the door fitting and latching into a frame, when the trap door is to be raised at stations to uncover the steps for use by the passengers.

The latch of the trap door is located on the trap door frame below the operator's controls and consequently is covered when the vestibule door is closed over the controls. It is therefore necessary to provide means for operating the latch to release the trap door when the vestibule door is thus closed over the controls. The problem is not new. It has been solved before insofar as mere operation of the latch is concerned. But the latch operating mechanism heretofore provided has required oversized slots in the door. This is not particularly objectionable if the vestibule door is used interiorly to close off the operator's compartment; but it is quite objectionable when the door in its alternate position is required to close the end of the car, because here the slots admit wind and water into and through the door with the result that the vestibule floor is made unsafe and the latch operating mechanism on the door is made useless, as by ice obstruction.

According to the present invention there is provided on the vestibule end door a trap door latch operating mechanism which not only operates the latch more positively, certainly and easily than previously known mechanisms but also completely excludes the weather when the door is closed over the end of the car aisle.

The above and other objects and advantages of the invention will be apparent from the following description of an exemplary embodiment, reference being made to the following drawings thereof, in which:

Fig. 1 is a plan view of the vestibule end of a car provided with mechanism embodying the present invention;

Fig. 2 is an enlarged outside elevation of the lower portion of the vestibule door when closed over, i. e. in front of, the trap door latch, the elevation being viewed from line 2—2 of Fig. 1;

Fig. 3 is an enlarged vertical section taken on the line 3—3 of Fig. 2; and

Fig. 4 is an enlarged elevation of the lower portion of the vestibule door showing the latch and latch operator in juxtaposition ready for operation, the elevation being viewed from the line 4—4 of Fig. 1.

Referring to the drawings, there is shown a railway passenger car 10 which provides one setting for the use of the invention. The car has a vestibule, generally indicated by the numeral 11, a side vestibule or control-covering door 12, an end vestibule door 13, and a trap door 14. The trap door is hinged at 15 on its rear edge so as to swing down over the stepwell or up against the rear vestibule wall over the side door when swung inward. A long torsion spring 17 urges the trap door toward raised position.

A latch 18 is mounted on the front edge of the floor frame for holding down the trap door and for starting it upward when released. The latch has an actuator such as an operating plunger 19 which is pushed down to release the trap door. In Fig. 1 it may be seen that the end vestibule and control-covering door 13 is mounted on hinges near the front inner corner of the trap door, specifically on a collision post 20, so as to swing from a first position, where it closes the front end of the aisle passage of the car, to a second position, where it covers or conceals the latch 18. In the second position, however, it leaves the trap door itself clear for opening and closing movement. In the second position the door 13 also covers the operator's controls 21, not specifically shown, above the latch. Latch means 22 are provided for holding the door 13 in either of its two positions. Operator's controls are understood to be provided at each end of each car and to be so arranged that a car or train of cars can be controlled from one end of any car, normally the front end of the front car. The front end of the front car will then be closed by the door 13, or, at least, the door will be swung out clear of the operator's station. The rear end of the car or rear car is also preferably closed. The controls are of such a nature as to be free from tampering even if the door is not closed over them.

Latch operating means are provided on the door 13 for operating the latch plunger 19 when the door is closed over the latch. This operating means comprises a shaft 24 turnably mounted and sealed in a bearing 25 extending through the door. On the inside the shaft 24 is provided with a cam arm 26 having a plunger engaging portion such as a cam surface 27 adapted to push the plunger 19 down as the arm 26 and shaft 24 are turned. On the outside the shaft is provided with an actuating arm 28 having a part 29 adapted to be engaged by the foot to turn the arm and shaft. On the inside a coil spring 30 is provided for restoring the shaft to a normal position in which the cam 27 stands above the upper end of the plunger 19 to avoid interference with it or the floor or other parts when the door is moved. A nut 31 secures the shaft assembly together. It is to be noted that the arm 28 is welded on the shaft 24. This presents the simplest and smoothest possible construction on the outside, where it is sometimes disposed. The assembled connection is left on the inside where it is protected. The door is fully weather-stripped so as to exclude weather when it is closed over the front end of the car.

In operation, when the door 13 is closed and latched over the latch and controls in what may be called its inside closed position, as shown in full lines in Fig. 1, the cam 27 on arm 26 is disposed above the upper end of the latch pin 19 and when the foot is pressed down on the plate or treadle 29 on the arm 28 on the outside of the door the cam and plunger are operated to actuate the latch 18 and release the trap door, subsequently pushing it up until the torsion spring 17 or a train crewman finally raises it to the fully open position. Thereafter the spring 30 takes the cam 27 back up clear of the plunger so the door 13 may be moved without interference with related parts. The trap door then can be pushed down and automatically latched in closed position.

While one embodiment of the invention has been illustrated and described it is to be understood that there may be various embodiments within the scope of the invention.

What is claimed is:

1. Trap door latch operating means adapted to operate a latch on the side of a trap door frame, comprising in combination with a trap door and a latch and latch actuator therefor on one side of the trap door frame, a vestibule door covering said latch actuator when moved into a closed position at the latch side of the trap door, and latch operating means mounted on said door in a position to engage and operate said latch actuator to release the trap door when the door is closed over the latch actuator, said latch operating means including a shaft extending through said door, means on one end of said shaft for engaging and operating said latch actuator, and means on the other end of the shaft accessible on the outer side of the door for turning the shaft to operate the latch.

2. Trap door latch operating means adapted to operate a trap door latch located on one side of the trap door, comprising in combination with a trap door and a latch and latch actuator therefor on one side of the trap door frame, a door swingable from an outer position to a position concealing said latch actuator and clearing the trap door, and a latch operator carried by said door, said operator including a shaft turnably mounted in a bearing through said door, a cam on the inner end of said shaft located in a position to operate said latch actuator when the door is closed over the latch actuator, an actuating lever on the outer end of said shaft, and resilient means acting on said shaft to keep the cam normally clear of the latch actuator when the door is closed over the latch actuator.

3. Trap door latch operating means adapted to operate a trap door latch located on one side of the trap door, the latch having a push-down actuator, comprising in combination, a door hinged on a vertical axis near the inner front corner of the trap door and adapted to swing from an outer position where it closes the front end of the vestibule aisle and is exposed to outside weather conditions, to an inner position where it stands in front of the front edge of the trap door and covers the latch actuator so it cannot be directly reached from outside the door, and a latch operating device on said door, said operating device including a shaft extending through a weather-sealed bearing in said door, a push-down cam arm fixed to the inner end of said shaft in a position to engage and operate said latch actuator when moved down, an operating arm on the outer end of said shaft, and means for normally holding said cam arm above said latch actuator and floor.

ALBERT G. DEAN.

No references cited.